United States Patent
Blythe et al.

(10) Patent No.: US 7,839,384 B2
(45) Date of Patent: Nov. 23, 2010

(54) DETECTING LIGHT TO DETERMINE POSITION OF OBJECT

(75) Inventors: Michael M. Blythe, Albany, OR (US); Jeffrey Thielman, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1672 days.

(21) Appl. No.: 11/065,776

(22) Filed: Feb. 26, 2005

(65) Prior Publication Data

US 2006/0192755 A1 Aug. 31, 2006

(51) Int. Cl.
*G09G 5/08* (2006.01)

(52) U.S. Cl. ...................... 345/158; 356/614

(58) Field of Classification Search ............... 345/158, 345/173, 166, 179; 356/614; 178/18.01, 178/19.01; 715/700, 761, 764; 353/28, 82; 340/815.57, 815.58
See application file for complete search history.

(56) References Cited

U.S. PATENT DOCUMENTS

| | | | |
|---|---|---|---|
| 4,095,881 A | 6/1978 | Maddox | |
| 5,521,616 A * | 5/1996 | Capper et al. | 345/156 |
| 5,900,863 A * | 5/1999 | Numazaki | 345/158 |
| 6,127,671 A | 10/2000 | Parsons et al. | |
| 6,161,935 A | 12/2000 | Oyama | |
| 6,690,018 B1 | 2/2004 | Barone | |
| 2003/0002018 A1 | 1/2003 | Magocs | |
| 2004/0070976 A1 | 4/2004 | Tausch et al. | |

* cited by examiner

*Primary Examiner*—Abbas I Abdulselam

(57) ABSTRACT

Infrared light is emitted towards a surface. The infrared light is redirected by an object positioned on the surface. The infrared light as redirected by the objected is detected. A position of the object on the surface is determined based on the infrared light detected.

22 Claims, 9 Drawing Sheets

DETECTING LIGHT TO DETERMINE POSITION OF OBJECT

BACKGROUND

Electronic devices have become very adept at enabling us to view and manipulate electronically displayed images. However, electronic devices are less adept at the intersection between "real life" and electronically displayed images. In other words, electronic devices are adept at manipulating and displaying electronically displayed images, but less adept at interacting with real, physical objects, like books, game pieces, and so on.

BRIEF DESCRIPTION OF THE DRAWINGS

The drawings referenced herein form a part of the specification. Features shown in the drawing are meant as illustrative of some embodiments of the present disclosure, and not of all embodiments of the present disclosure.

DETAILED DESCRIPTION OF THE DRAWINGS

In the following detailed description of exemplary embodiments of the present disclosure, reference is made to the accompanying drawings that form a part thereof, and in which is shown by way of illustration specific exemplary embodiments in which the present disclosure may be practiced. These embodiments are described in sufficient detail to enable those skilled in the art to practice the disclosed embodiments. Other embodiments may be utilized, and logical, mechanical, electrical, electro-optical, software/firmware and other changes may be made without departing from the spirit or scope of the present disclosure. The following detailed description is, therefore, not to be taken in a limiting sense, and the scope of the present disclosure is defined only by the appended claims.

Figure 1:
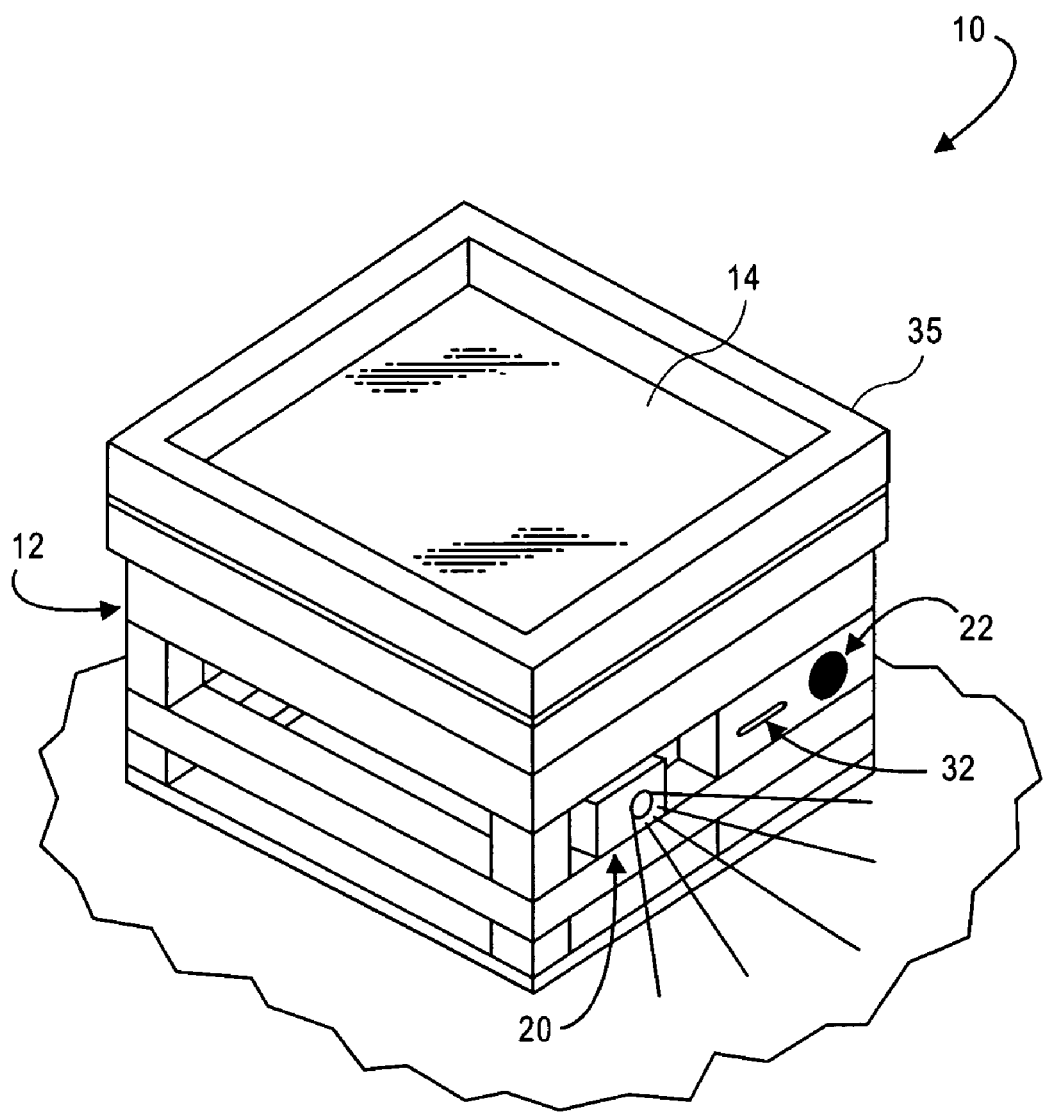
FIG. 1 is a diagram of a perspective view of an embodiment of an interactive display system, according to an embodiment of the present disclosure.
Figure 2:
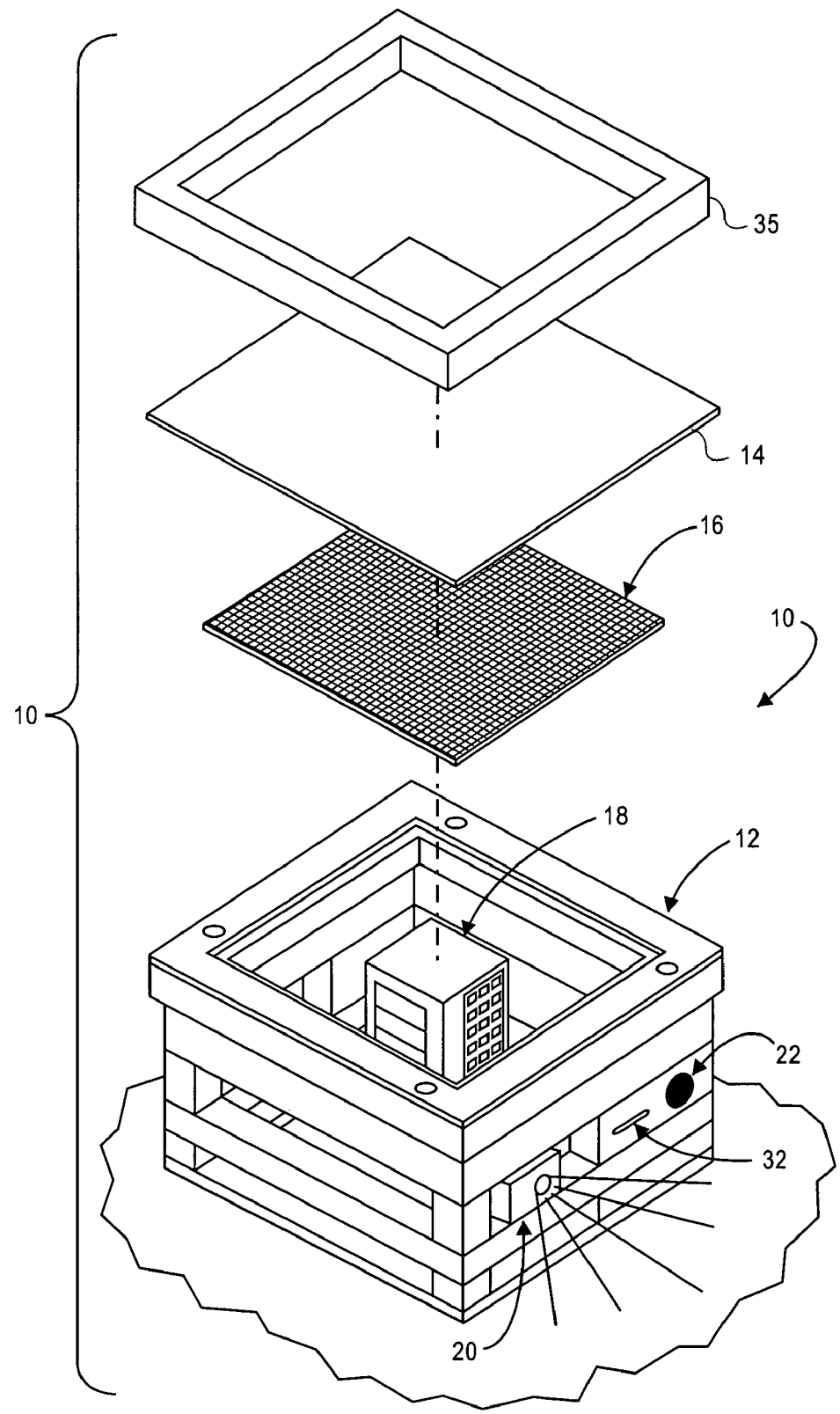
FIG. 2 is a diagram of an exploded view of the embodiment of the interactive display system of FIG. 1, according to an embodiment of the present disclosure.

FIGS. 1 and 2 show an embodiment of an interactive display system, interactive display system 10, according to an embodiment of the present disclosure. The interactive display system 10 is depicted in FIGS. 1 and 2 as embodied in a table 12, with the table surface functioning as the display surface 14. Multiple users can view and access the display surface 14 by sitting around the table 12. It is noted that the physical embodiment of the display system 10 can take any number of forms other than that of a table. The interactive display system 10 itself may be more generally referred to as an electronic device.

The interactive display system 10 can include a touch-sensitive display surface 14, a display device 16, and a controller 18. According to one embodiment, the controller 18 is configured to generate electrical image signals indicative of viewable images, such as computer programs, movie videos, video games, Internet web pages, and so on, which are provided for generation to the display device 16. The display device 16, in response to the electrical signals, generates digital optical (viewable) images that are viewable on the display surface 14. The controller 18 may receive data and other information to generate the image signals from various sources, such as hard disk drives, compact discs (CD's) or digital versatile discs (DVD's) 32, computer servers, local and/or wide area networks, the Internet, and so on. The controller 18 may also provide additional output in the form of projected images from an auxiliary projector 20 and sound from a speaker 22.

As shown in FIGS. 1 and 2, the interactive display system 10 can include a variety of other components, such as a projector 20, configured to simultaneously project the content of the display surface 14 onto a wall-mounted screen, for instance. Alternatively, the projector 20 may display content that is different than the content displayed on the display surface 14. The interactive display system 10 may also include one or more speakers 22 for producing audible sounds that accompany the visual content on the display surface 14. Further, the interactive display system 10 may include one or more devices for storing and retrieving data, such as a CD or DVD drive, hard disk drives, flash memory ports, and so on.

The systems and methods of embodiments of the present disclosure are not limited to displaying information to a display surface 14 using a particular type of display device 16. For instance, any number of suitable display devices may be used, such as a liquid crystal display (LCD), a plasma display, or another type of flat panel display, as well as a cathode-ray tube (CRT) or another type of display device. The display device 16 may also assume a variety of forms in differing embodiments of the present disclosure.

In general, the display device 16 generates a viewable digital image on the display surface 14 by projecting a plurality of pixels of light onto the display surface 14. Each viewable image may be made up of millions of pixels, a fewer number pixels, or a greater number of pixels. Each pixel may be individually controlled and addressable by the display device 16 to have a certain color (or gray-scale). The combination of many light pixels of different colors (or gray-scales) on the display surface 14 generates a viewable image or "frame." Continuous video and graphics may be generated by sequentially combining frames together, as in a motion picture.

One embodiment of a display device 16 includes a projector device, such as a digital light projector (DLP) having a digital micro-mirror device (DMD) configured to vary the projection of light pixels onto the display surface 14. Other embodiments could include, but are in no way limited to, diffractive light devices (DLD), liquid crystal on silicon (LCOS) projection, as well as non-projection-type displays, such as plasma displays, and liquid crystal displays (LCD's). Additionally, other display technologies could be substituted for the DLP (16) without varying from the scope of the present disclosure.

The touch-sensitive display surface 14 may, in one embodiment of the present disclosure, be present to provide the users of the system 10 with a form of user input. The touch-sensitive display surface 14 is sensitive to the placement of physical objects, such as the fingertips of users, and so on, thereon. The touch-sensitive display surface 14 may employ any of a number of different types of touch-detection technology, such as resistive, capacitive, infrared, optical wave, and/or other types of touch-detection technologies. In one embodiment, a back-side imaging camera renders the surface 14 touch sensitive by detecting user input on the surface 14.

The display device 16 may in one embodiment be able to generate infrared light for emission upwards through the at least substantially transparent or translucent tabletop surface 14. Alternatively, another infrared light source may be used in addition to and/or in lieu of the display device 16. The infrared light emitted may be encoded with a signal. Furthermore, one or more infrared light detectors 35 are disposed around the perimeter of the surface 14. The infrared light detectors 35 are able to detect infrared light. The infrared light detectors 35 are depicted in FIGS. 1 and 2 as being disposed in a rectangular frame or shelf extending around the perimeter of the surface 14. Alternatively, the infrared light detectors 35 may be disposed on one or more edges of the surface 14.

Figure 3:
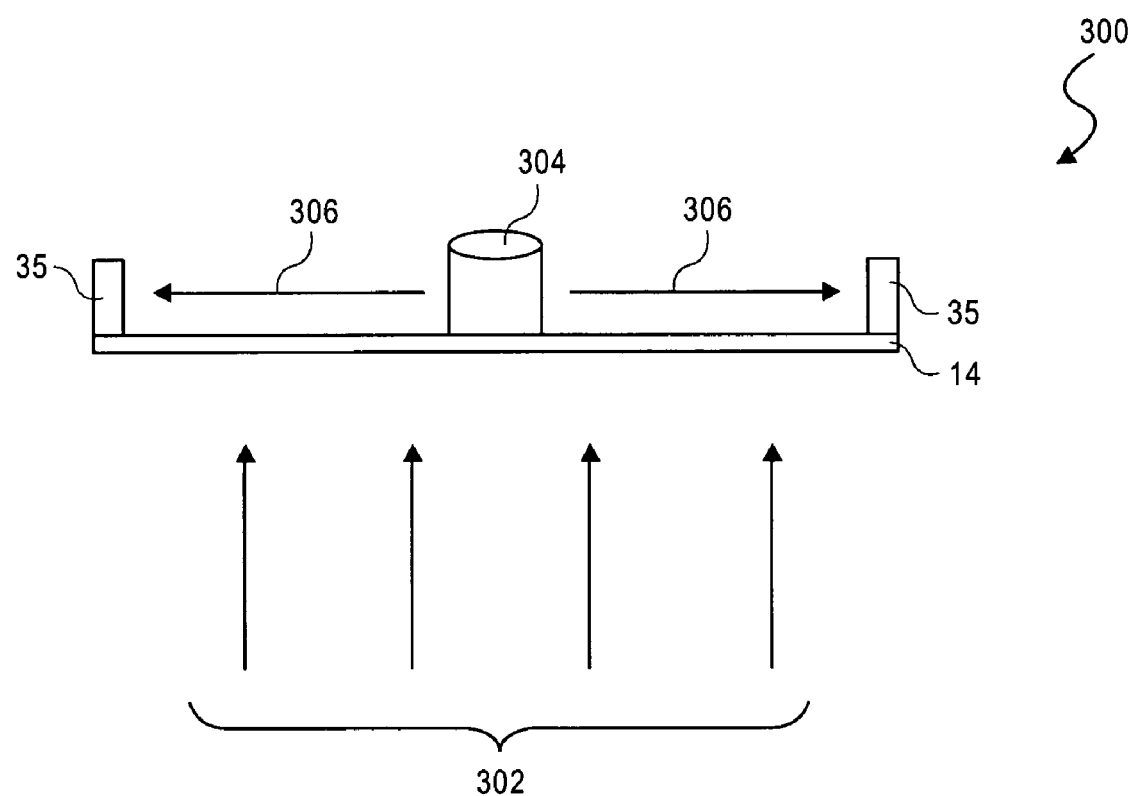
FIG. 3 is a diagram depicting how an object placed on a tabletop surface of an embodiment of an interactive display system is able to redirect infrared light emitted upwards through the surface for detection by infrared detectors on the perimeter of the surface, according to an embodiment of the present disclosure.

FIG. 3 shows a scenario 300 depicting how a physical object 304 placed on the tabletop surface 14 is able to redirect infrared light 302 for detection by the infrared light detectors 35, according to an embodiment of the present disclosure. Infrared light 302 is emitted from underneath the tabletop surface 14 upwards through the surface 14. The infrared light 302 may be emitted by the display device 16, or by another infrared light source. The physical object 304 redirects the infrared light 302 at substantially ninety degrees, to result in the redirected infrared light 306. The redirected infrared light 306 is then detected by one or more of the infrared light detectors 35.

In FIG. 3, the physical object 304 is depicted as redirecting the infrared light 302 in two directions. However, alternatively, the physical object 304 may be able to redirect the infrared light 302 in one direction, or in more than two directions. The physical object 304 may be a game piece, such as a chess piece and the like, an electronic device, such as a remote control, a mobile phone, or another type of electronic device. The physical object 304 may further be a different type of physical object as well.

Figure 4:
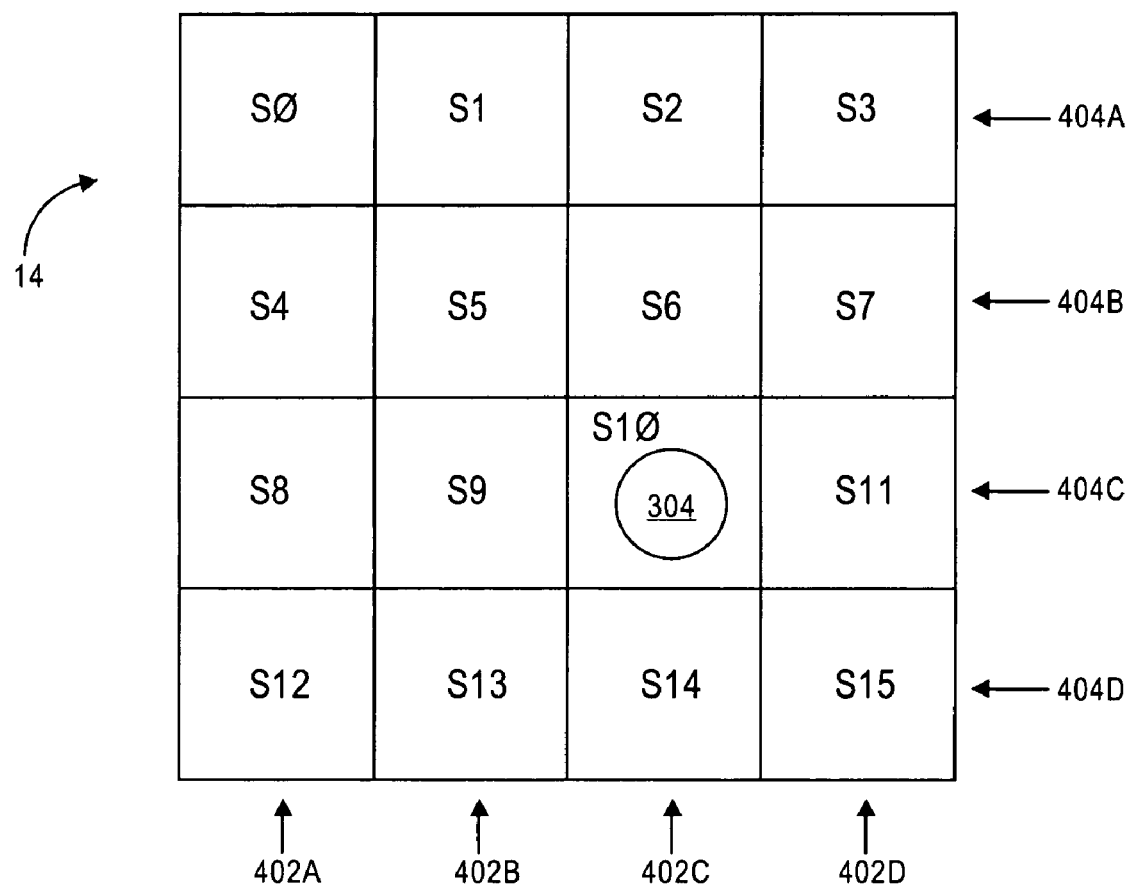
FIGS. 4 and 5 are diagrams depicting how the detection of redirected infrared light by an object placed on a tabletop surface of an embodiment of an interactive display system is able to be used to determine the position of the object on the surface, according to varying embodiments of the present disclosure.
Figure 5:
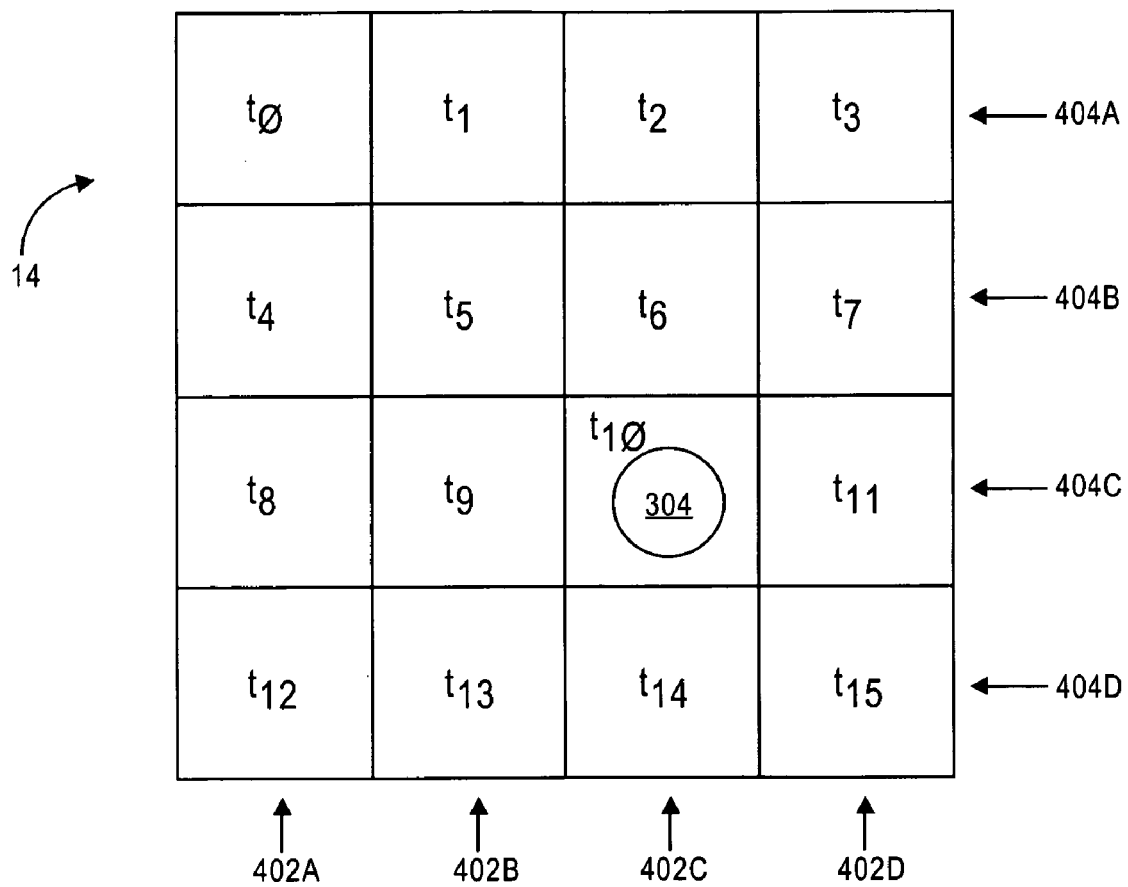

FIGS. 4 and 5 show how the position of the physical object 304 on the tabletop surface 14 can be determined by the detection of the infrared light redirected by the physical object 304, according to varying embodiments of the present disclosure. The tabletop surface 14 is logically divided into a grid of positions organized into a number of columns 402A, 402B, 402C, and 402D, collectively referred to as the columns 402, and a number of rows 404A, 404B, 404C, and 404D, collectively referred to as the rows 404. Whereas there are four columns 402 and four rows 404, resulting in four times four equals sixteen different positions, in FIGS. 4 and 5 for descriptive and illustrative clarity, in other embodiments, there may be more or less such positions. For instance, there may be 1280×720 positions in one embodiment of the present disclosure.

Furthermore, whereas the object 304 is depicted in FIGS. 4 and 5 as having been placed on the position identified by the column 402C and the row 404C, in other embodiments, the object 304 may be placed on other positions. In one embodiment, the object 304 may be placed such that it overlaps more than one of the positions. This is especially the case where the positions are themselves each smaller than the footprint of the object 304 itself. For instance, the object 304 may have a footprint having a size that is equal to the sizes in total of a number of the positions, especially where there are a large number of positions, such as 1280×720 positions, on the tabletop surface 14.

In the embodiment corresponding to FIG. 4, the infrared light that is emitted upwards through the tabletop surface 14 is encoded with a different signal depending on the position of the tabletop surface 14 through which the light is being emitted. As depicted in FIG. 4, the position identified by the column 402A and the row 404A has infrared light emitted therethrough encoded with a signal S0, the position identified by the column 402B and the row 404A has infrared light emitted therethrough encoded with a signal S1, and so on. Thus, the last position identified by the column 402D and the row 404D has infrared light emitted therethrough encoded with a signal S15.

The object 304, due to its placement on the position of the tabletop surface 14 identified by the column 402C and the row 404C, redirects infrared light that has been encoded with the signal S10. As a result, the infrared light encoded with the signal S10 is detected by the infrared detectors 35. With this placement of object 304, other infrared light would not be detected by infrared detectors 35. Therefore, the position of the object 304 on the tabletop surface 14 is able to be determined as the position identified by the column 402C and the row 404C. If there is more than one object on the tabletop surface 14, the positions of all the objects can be determined in like manner, although it will not be able to be discerned which particular object is on which particular position in this embodiment, it will be able to discern that there is one of the objects on a given position.

In FIG. 5, the infrared light that is emitted upwards through the tabletop surface 14 is emitted at different positions of the surface 14 at different times in one embodiment. As depicted in FIG. 5, the position identified by the column 402A and the row 404A has infrared light emitted therethrough at the time $t_0$, the position identified by the column 402B and the row 404A has infrared light emitted therethrough at the time $t_1$, and so on. Thus, the last position identified by the column 402D and the row 404D has infrared light emitted therethrough at the time $t_{15}$.

The object 304, due to its placement on the position of the tabletop surface 14 identified by the column 402C and the row 404C, redirects infrared light that is emitted through this position at the time $t_{10}$. As a result, infrared light as redirected by the object 304 is detected by the infrared detectors at substantially the time $t_{10}$, such as a little after the time $t_{10}$, but before the time $t_{11}$. Therefore, the position of the object 304 on the tabletop surface 14 is able to be determined as the position identified by the column 402C and the row 404C. If there is more than one object on the tabletop surface 14, the positions of all the objects can be determined in like manner, although it will not be able to be discerned which particular object is on which particular position in this embodiment, but it will be able to discern that there is one of the objects on a given position.

As can be appreciated by those of ordinary skill within the art, infrared light emitted upwards through the substantially transparent tabletop surface 14 can be employed in other ways in other embodiments, besides those described in relation to FIGS. 4 and 5, to determine the locations of objects on the surface 14 based on detection of the infrared light as redirected by the objects. For example, a combination of the approaches described in relation to FIGS. 4 and 5 can be used. Alternatively, a completely different approach other than those described in FIGS. 4 and 5 can be used.

Figure 6:
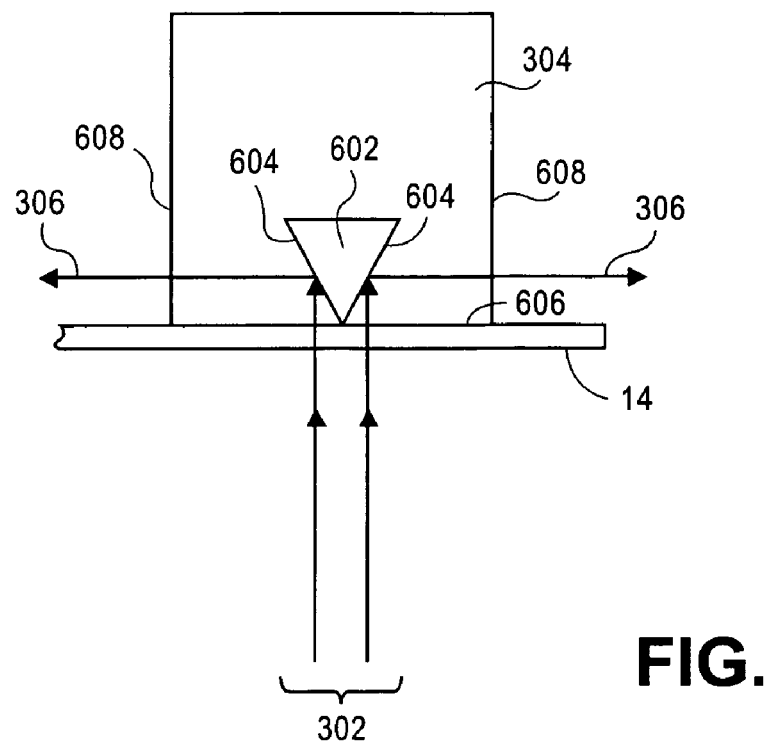
FIGS. 6 and 7 are diagrams depicting how a physical object is able to redirect infrared light, according to varying embodiments of the present disclosure.
Figure 7:
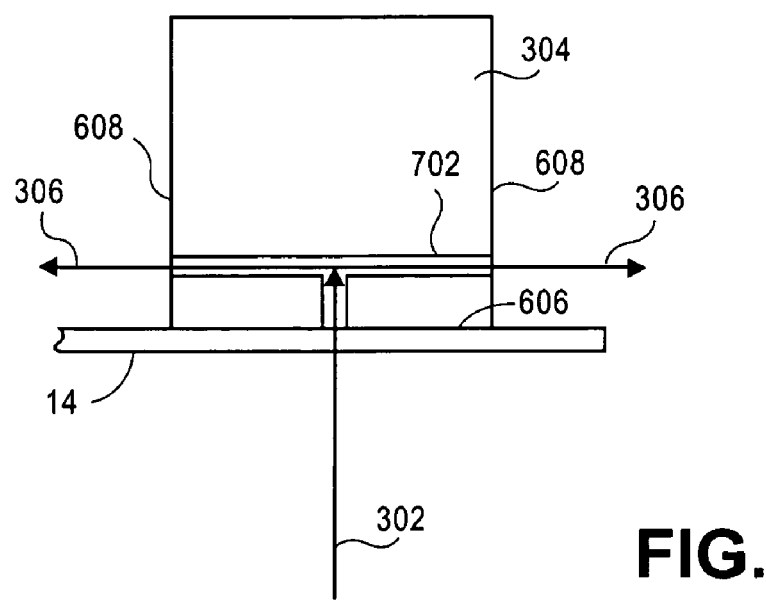

FIGS. 6 and 7 show how the physical object 304 is able to redirect the infrared light 302, in varying embodiments of the present disclosure. The physical object 304 has an at least substantially transparent bottom surface or base 606, and side surfaces 608 that are at least substantially transparent towards the base 606. The base 606 of the physical object 304 rests on the tabletop surface 14.

In FIG. 6, an inverted cone 602 is positioned at the bottom of the physical object 304. The inverted cone 602 has reflective surfaces 604. The reflective surfaces 604 may be mirrored surfaces in one embodiment, for instance. The infrared light 302 emitted upwards through the tabletop surface 14 impinges the reflective surfaces 604 of the inverted cone 602. As a result, the infrared light 302 is reflected substantially at ninety degrees, resulting in the redirected infrared light 306.

In FIG. 7, a fiber optic line 702 is positioned at the bottom of the physical object 304. The infrared light 302 emitted upwards through the tabletop surface 14 is routed by the fiber optic line 702, such that it is redirected by at least substantially ninety degrees, resulted in the redirected infrared light 306. The physical object 304 may redirect the emitted infrared light 302 in ways other than those depicted in FIGS. 6 and 7, as can be appreciated by those of ordinary skill within the art. The inverted cone 602 and the fiber optic line 702 may be more generally referred to as redirection mechanisms.

Figure 8:
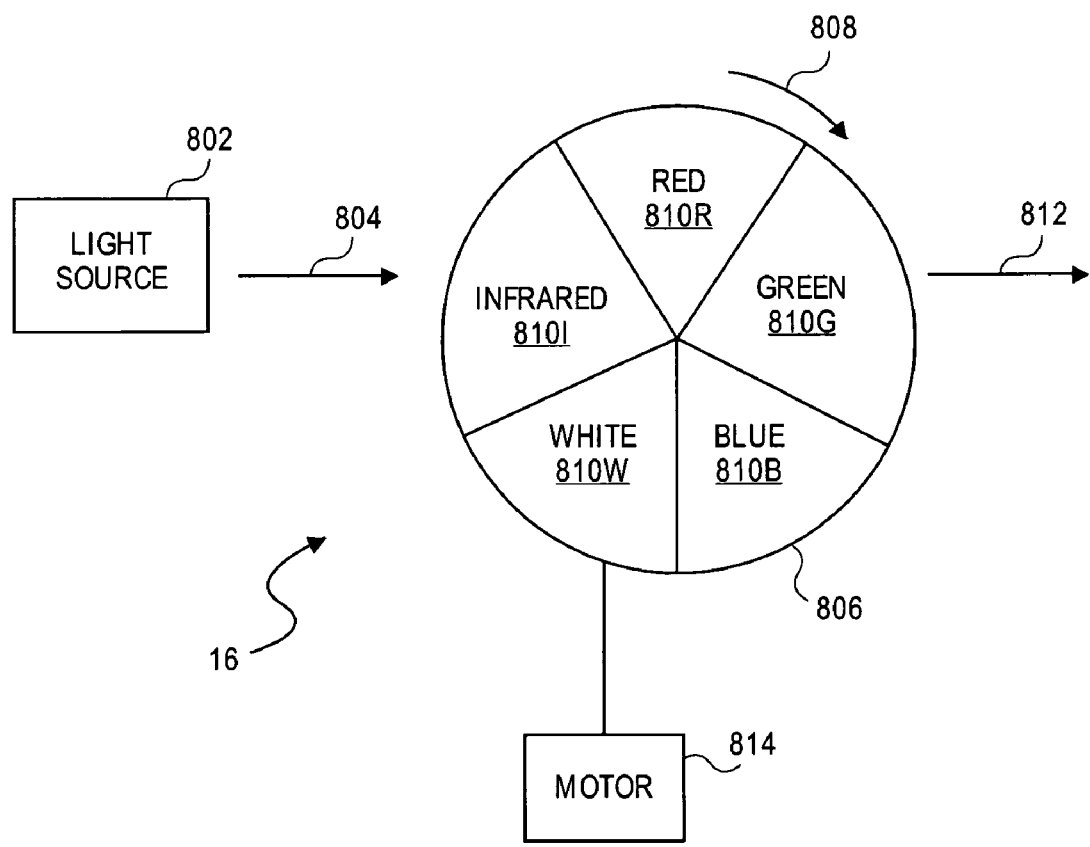
FIG. 8 is a diagram depicting how an embodiment of a projector of an embodiment of an interactive display system is able to emit infrared light, according to an embodiment of the present disclosure.

FIG. 8 shows how the display device 16 is able to emit infrared light, according to an embodiment of the present disclosure. The display device 16 is more generally a projector. The display device 16 includes a light source 802, a rotatable color wheel 806, and a motor 814. The light source 802 emits light 804 that has a frequency spectrum encompassing at least the infrared frequency spectrum, and in one embodiment the visible light frequency spectrum as well. The motor 814, or other rotating mechanism, rotates the color wheel 806, as indicated by the arrow 808. At any given point in time, one of the portions 810I, 810R, 810G, 810B, and 810G, collectively referred to as the portions 810, is incident to the light 804, as the color wheel 806 is rotated. Therefore, at different points in time, the light 804 travels through one of these portions 810, to result in the filtered light 812.

When the infrared portion 810I is incident to the light 804, the portion 810I causes the infrared frequencies of the light 804 to pass through and be emitted as the filtered light 812, while attenuating other frequencies. Similarly, when the red portion 810R, the green portion 810G, and the blue portion 810B are incident to the light 804, the portions 810R, 810G, and 810B cause the red, green, and blue frequencies, respectively, of the light 804 to pass through and be emitted as the filtered light 812, while, respectively, while attenuating other frequencies. When the white portion 810W is incident to the light 804, the portion 810W causes the entire visible (white) frequency spectrum of the light 804 to pass through and be emitted as the filtered light 812. The rotatable colored wheel 806 is depicted as included five different filtering portions 810. In other embodiments of the present disclosure, there may be more or less of such portions 810. For instance, where there is an infrared light-emitting device in addition to a display device to display images for viewing by users, such an infrared light-emitting device may be implemented using a filter that allows infrared light to pass through, and attenuates other frequencies of light.

Figure 9:
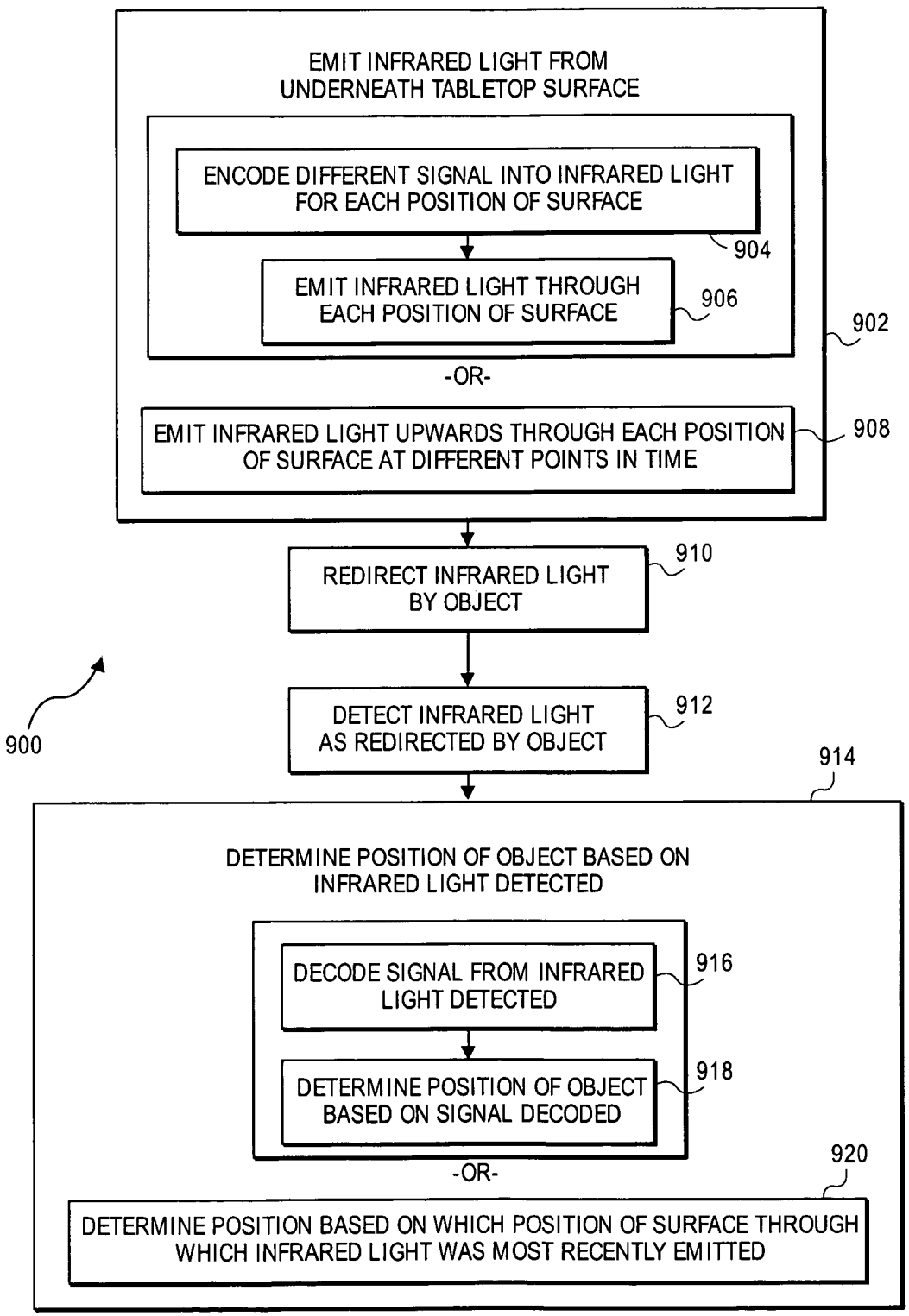
FIG. 9 is a flowchart of an embodiment of a method for determining the position of an object placed on the tabletop surface of an embodiment of an interactive display system, according to an embodiment of the present disclosure.

FIG. 9 shows an embodiment of a method 900 for determining the position of a physical object placed on the tabletop surface 14 of the interactive display system 10, according to an embodiment of the present disclosure. At least some parts of the method 900 may be implemented as parts of a computer program stored on a computer-readable medium for execution by the system 10. For example, the computer program parts may be software objects, subroutines, routines, and so on. The computer-readable medium may be a removable or a non-removable medium, and a volatile or a non-volatile medium. The medium may be a semiconductor medium, such as a memory, a magnetic medium, such as a hard disk drive or a floppy disk, and/or an optical medium, such as a CD or a DVD.

Infrared light is emitted or caused to be emitted from underneath the tabletop surface 14 upwards through the tabletop surface 14 (902). In one embodiment of the present disclosure, such infrared light emission may be accomplished by encoding a different signal into the infrared light for each position of the surface 14 (904), and emitting the infrared light through each position of the surface 14 (906), as has been described in relation to FIG. 4. In another embodiment of the present disclosure, infrared light emission may be accomplished by emitting infrared light upwards through each position of the surface 14 at different points in time (908), as has been described in relation to FIG. 5.

The infrared light is redirected by the physical object 304 placed on the tabletop surface 14 (910), as has been described in relation to FIG. 3. For example, the object 304 may have an inverted cone with reflective surfaces to redirect the infrared light, as described in relation to FIG. 6, or it may have a fiber optic line to redirect the infrared light, as described in relation to FIG. 7. The infrared light redirected by the object 304 is detected (912), as has been described in relation to FIG. 3.

The position of the object 304 on the tabletop surface 14 is determined based on the infrared light detected (914). In one embodiment of the present disclosure, the signal encoded into the infrared light is decoded (916), such that the position of the object 304 is determined based on the signal decoded from the infrared light (918), as has been described in relation to FIG. 4. In another embodiment of the present disclosure, the position of the object 304 is determined based on which position of the surface 14 through which infrared light was most recently emitted (920), as has been described in relation to FIG. 5.

Figure 10:
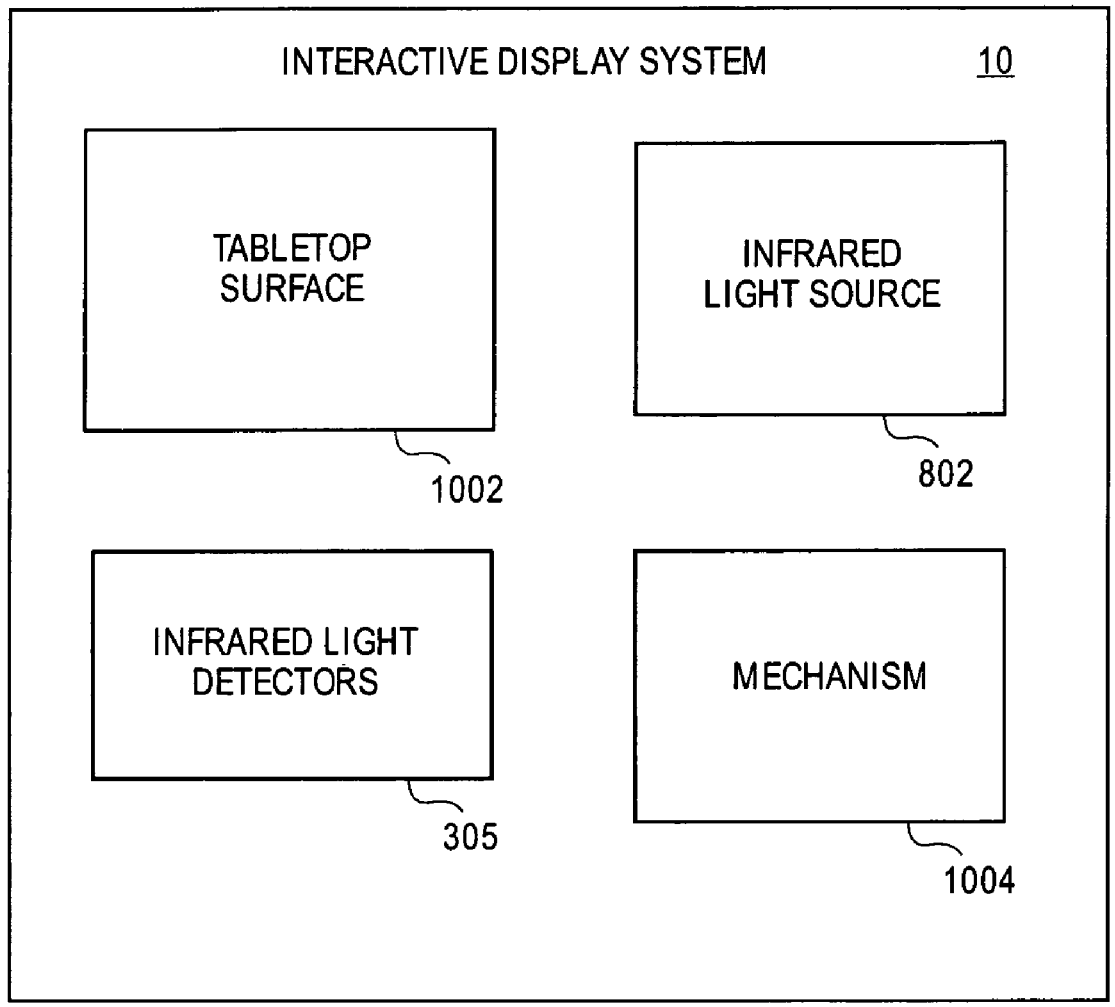
FIG. 10 is a rudimentary block diagram of an embodiment of an interactive display system, according to an embodiment of the present disclosure.

FIG. 10 shows a rudimentary block diagram of an embodiment of a display system, such as the interactive display system 10, according to an embodiment of the present disclosure. The interactive display system 10 is depicted as including a tabletop surface 1002, the infrared light source 802, the infrared light detectors 305, and a mechanism 1004. As can be appreciated by those of ordinary skill within the art, the interactive display system 10 may have other mechanisms, in addition to and/or in lieu of those depicted in FIG. 10, such as those described in relation to FIGS. 1 and 2.

The tabletop surface 1002 is substantially transparent and can be receptive to user touch input. The surface 1002 may include the display surface 14 that has been described. One or more physical objects are positionable on the surface 1002. The infrared light source 802 emits infrared light from underneath the surface 1002 upwards through the surface 1002, and the physical object redirect the infrared light. The infrared light source 802 may be part of the display device 16 that has been described, or may be a light source other than the display device 16.

The infrared light detectors 305 are situated around the perimeter of the surface 1002, and detect the infrared light reflected by the physical objects. The mechanism 1004 may be software, hardware, or a combination of software and hardware. The mechanism 1004 determines the position of each object on the surface 1002 based on the infrared light redirected by each object as detected by the infrared light detectors 305.

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present disclosure. Therefore, it is manifestly intended that this present disclosure be limited only by the claims and equivalents thereof.

We claim:

1. A method comprising:
   emitting infrared light towards a surface;
   redirecting the infrared light by an object positioned on the surface;
   detecting the infrared light as redirected by the object; and,
   determining a position of the object on the surface based on the infrared light detected;
   wherein the infrared light is emitted at different times to determine the position of the object.

2. The method of claim 1, wherein the infrared light is emitted from underneath a tabletop surface.

3. The method of claim 2, wherein determining the position of the object on the surface comprises:
   decoding a signal from the infrared light detected; and,
   determining the position of the object on the surface based on the signal decoded from the infrared light detected.

4. The method of claim 1, wherein emitting the infrared light comprises, for each position of a plurality of positions of the surface:
   encoding a different signal into the infrared light; and,
   emitting the infrared light with the different signal encoded therein through the position of the surface.

5. The method of claim 1, wherein determining the position of the object on the surface comprises determining the position of the object on the surface based on the position on the surface through which infrared light was most recently emitted.

6. An electronic device comprising:
   a surface on which one or more objects are positionable;
   an infrared light source to emit infrared light through the surface, each of the objects capable of redirecting the infrared light;
   wherein to emit the infrared light comprises, for each position of a plurality of positions of the surface, to emit the infrared light through the position on the surface at a different time;
   one or more infrared light detectors situated around a perimeter of the surface to detect the infrared light redirected by each of the objects; and,
   a mechanism to determine a position of each of the objects based on the infrared light redirected by the object as detected by the infrared light detectors.

7. The electronic device of claim 6, wherein the tabletop surface is at least one of transparent and translucent.

8. The electronic device of claim 6, wherein the infrared light source is part of a projector, the projector also to project a viewable image for viewing through the surface.

9. The electronic device of claim 6, wherein the infrared light source is to emit the infrared light having different signals encoded therein through different positions of the surface for the mechanism to determine the position of each object based on a signal decoded from the infrared light redirected by the object as detected by the infrared light detectors.

10. The electronic device of claim 6, wherein the infrared light source is to emit the infrared light through different positions of the surface at different times for the mechanism to determine the position of each object based on a time at which the infrared light redirected by the object is detected by the infrared light detectors.

11. The electronic device of claim 6, wherein at least one of the objects each comprises an inverted reflective cone at a bottom thereof to redirect the infrared light at substantially ninety degrees.

12. The electronic device of claim 6, wherein at least one of the objects each comprises one or more fiber optic lines to redirect the infrared light at substantially ninety degrees.

13. The electronic device of claim 6, wherein the one or more infrared light detectors comprises an infrared light detector at each of a plurality of edges of the surface.

14. An electronic device comprising:
   a tabletop surface on which one or more objects are positionable;
   means for emitting infrared light from underneath the surface and upwards through the surface, each object capable of redirecting the infrared light;
   wherein the means for emitting the infrared light comprises, for each position of a plurality of positions of the surface, means for emitting the infrared light through the position on the surface at a different time;
   means for detecting the infrared light redirected by each object; and,
   means for determining a position of each object based on the infrared light redirected by the object as detected.

15. An object positionable on a surface through which infrared light is to be directed, comprising:
   a base to rest on the surface; and,
   a redirection mechanism disposed within the base to redirect the infrared light directed through the surface at substantially ninety degrees;
   wherein the infrared light is directed through each position of a plurality of positions of the surface at a different time.

16. The physical object of claim 15, wherein the redirection mechanism comprises an inverted cone having one or more reflective outer surfaces.

17. The physical object of claim 15, wherein the redirection mechanism comprises one or more fiber optic lines.

18. A non-transitory computer-readable medium having a computer program stored thereon comprising:
   a first computer program part to cause infrared light to be emitted towards a surface;
   wherein to cause the infrared light to be emitted comprises, for each position of a plurality of positions of the surface, the first computer program to cause the infrared light to be emitted through the position on the surface at a different time; and
   a second computer program part to determine a position of an object on the surface based on the infrared light being redirected by the object and detected.

19. The computer-readable medium of claim 18, wherein the first computer program part is to, for each position of a plurality of positions of the surface, encode a different signal into the infrared light and cause the infrared light with the different signal encoded therein to be emitted upwards through the position of the surface.

20. The computer-readable medium of claim 19, wherein the second computer program part is to decode a signal from the infrared light redirected by the object and detect and determine the position of the object on the surface based on the signal decoded from the infrared light.

21. The computer-readable medium of claim 18, wherein the first computer program part is to, for each position of a plurality of positions of the surface, cause the infrared light to be emitted upwards through the position of the surface at a different time.

22. The computer-readable medium of claim 21, wherein the second computer program part is to determine the position of the object on the surface based on the position of the surface through which infrared light was most recently emitted.

\* \* \* \* \*